United States Patent
Chen et al.

(10) Patent No.: US 8,909,983 B2
(45) Date of Patent: Dec. 9, 2014

(54) METHOD OF OPERATING A STORAGE DEVICE

(75) Inventors: Hsuan-Ting Chen, Taichung (TW); Kuei-Huan Chen, New Taipei (TW); Ming-Hung Tsai, New Taipei (TW)

(73) Assignee: Synology Incorporated, Taipei (TW)

( * ) Notice: Subject to any disclaimer, the term of this patent is extended or adjusted under 35 U.S.C. 154(b) by 146 days.

(21) Appl. No.: 13/414,739

(22) Filed: Mar. 8, 2012

(65) Prior Publication Data
US 2013/0238927 A1 Sep. 12, 2013

(51) Int. Cl.
G06F 11/00 (2006.01)
(52) U.S. Cl.
USPC .......................................... 714/6.1; 714/6.32
(58) Field of Classification Search
USPC .......................................................... 714/6.1
See application file for complete search history.

(56) References Cited

U.S. PATENT DOCUMENTS

| | | | |
|---|---|---|---|
| 5,898,861 A * | 4/1999 | Emerson et al. | 703/23 |
| 7,428,665 B2 * | 9/2008 | Subramanian et al. | 714/43 |
| 7,853,831 B2 * | 12/2010 | Subramanian et al. | 714/43 |
| 8,458,510 B2 * | 6/2013 | Han et al. | 714/4.1 |
| 2002/0049923 A1 * | 4/2002 | Kanazawa et al. | 714/5 |
| 2004/0236907 A1 * | 11/2004 | Hickman et al. | 711/114 |
| 2005/0210318 A1 * | 9/2005 | Marks et al. | 714/7 |
| 2006/0112304 A1 | 5/2006 | Subramanian | |
| 2006/0230306 A1 * | 10/2006 | Richards et al. | 714/7 |
| 2007/0266186 A1 * | 11/2007 | Woodral | 710/16 |
| 2008/0215808 A1 * | 9/2008 | Ashmore et al. | 711/113 |
| 2009/0100278 A1 * | 4/2009 | Caruk et al. | 713/300 |
| 2009/0249112 A1 * | 10/2009 | Diab | 714/2 |
| 2012/0030510 A1 * | 2/2012 | Hong | 714/14 |
| 2012/0042198 A1 * | 2/2012 | Han et al. | 714/4.21 |
| 2013/0013905 A1 * | 1/2013 | Held et al. | 713/2 |

* cited by examiner

*Primary Examiner* — Kamini Patel
(74) *Attorney, Agent, or Firm* — Winston Hsu; Scott Margo

(57) ABSTRACT

A device power is supplied for running a storage device. When a device error occurs, a recovery operation is performed on the storage device. When the recovery operation fails, the device power is reset in a compatibility verification operation and the recovery operation is performed again on the storage device.

5 Claims, 2 Drawing Sheets

METHOD OF OPERATING A STORAGE DEVICE

BACKGROUND OF THE INVENTION

1. Field of the Invention

The present invention is related to a method of operating a storage device, and more particularly, to a method of performing a recovery operation on a hard disk.

2. Description of the Prior Art

In nearly all computing environments, systems rely heavily on local hard disks which are configured to store one or more operating systems, applications, system data or user data, etc. It is of critical importance to a well-functioning computing environment that such hard disks function properly, but the inevitable reality is that computer hard disk drive (HDD) failure occurs on occasion.

One of the significant problems many computer users are facing today is onerous recovery operations when encountering hard disk failure. If the recovery operation fails, the hard disk is dropped in the prior art. The majority of hard disk failures are caused by hard disk corruption, such as virus intrusion, human error in configuration, mistakes or incompatibility in new software installation, or electrical or mechanical malfunction. However, a temporary hard disk error may occur due to unready hardware status (such as slow disk or chip response) or poor hard disk quality. Under such circumstances, the hard disk may still function normally after rebooting the system. In the prior art method, a functional hard disk may be dropped when the recovery operation fails due to temporary hard disk errors.

SUMMARY OF THE INVENTION

The present invention provides a method of operating a storage device. The method includes supplying a device power for running the storage device; performing a recovery operation on the storage device when detecting a device error; resetting the device power when the recovery operation fails; and re-performing the recovery operation on the storage device after resetting the device power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
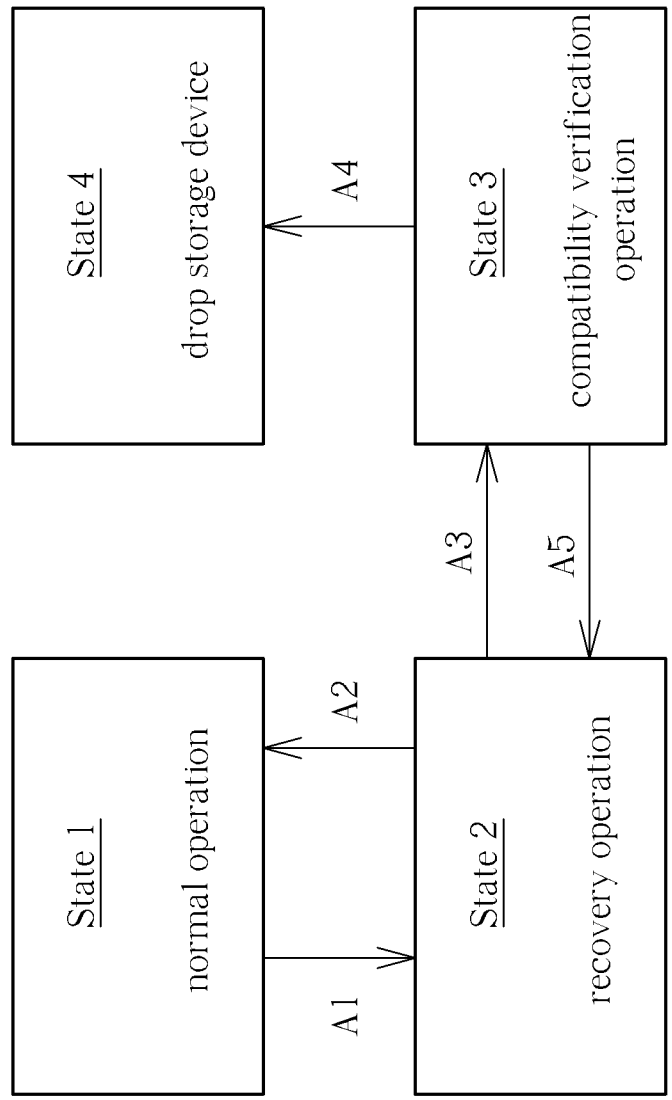
FIG. 1 is a state diagram illustrating a method of operating a storage device according to the present invention.

FIG. 1 is a state diagram illustrating a method of operating a storage device according to the present invention. The storage device may operate in four main states.

State 1: the storage device is in normal operation;
State 2: the storage device is performing a recovery operation;
State 3: the storage device is performing a compatibility verification operation; and
State 4: the storage device is dropped.

Figure 2:
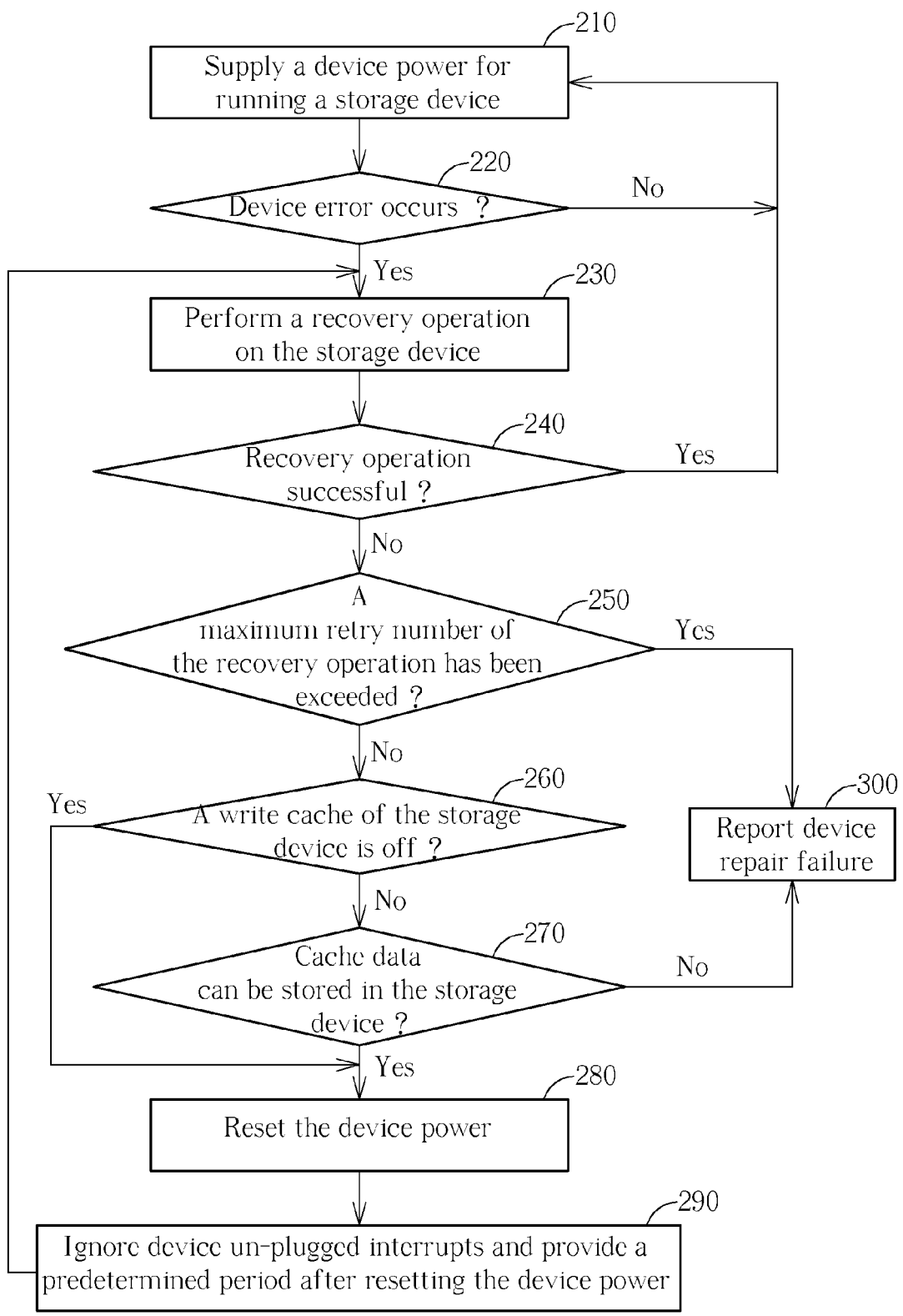
FIG. 2 is a flowchart illustrating a method of operating a storage device according to the present invention.

FIG. 2 is a flowchart illustrating a method of operating a storage device according to the present invention.

Step 210: supply a device power for running a storage device; execute step 220.
Step 220: determine if a device error occurs: if yes, execute step 230; if no, execute step 210.
Step 230: perform a recovery operation on the storage device, execute step 240.
Step 240: determine if the recovery operation is successful: if yes, execute step 210; if no, execute step 250.
Step 250: determine if a maximum retry number of the recovery operation has been exceeded: if yes, execute step 300; if no, execute step 260.
Step 260: determine if a write cache of the storage device is off: if yes, execute step 280; if no, execute step 270.
Step 270: determine if cache data can be stored in the storage device after flushing the write cache: if yes, execute step 280; if no, execute step 300.
Step 280: reset the device power, execute step 290.
Step 290: ignore device un-plugged interrupts and provide a predetermined period after resetting the device power, execute step 230.
Step 300: report device repair failure.

In step 210, the device power is supplied so that the storage device may operate normally in State 1.

In step 220, it is determined whether a device error occurs when the storage device is operating in State 1. If no device error is detected, the storage device continues to operate in State 1. When detecting a device error, the storage device switches to State 2 for performing the recovery operation in step 230, as indicated by an arrow A1 in FIG. 1.

In step 230, it is determined if the recovery operation is successful. If the storage device can be repaired in step 230, the storage device may switch back to State 1, as indicated by an arrow A2 in FIG. 1. If the storage device cannot be repaired in step 230, the storage device may switch to State 3 for performing the compatibility verification operation, as indicated by an arrow A3 in FIG. 1.

In an embodiment of the present invention, the compatibility verification process may include steps 250-290.

In step 250, it is determined whether the recovery operation has been performed more than a predetermined number of times. Since the recovery operation always fails if the detected device error is caused by permanently damaged or malfunctioning storage device, step 260 may be executed only when the maximum retry number of the recovery operation has not been exceeded in the present invention. Otherwise, the present method may execute step 300 for reporting device repair failure and the storage device may switch to State 4, as indicated by an arrow A4 in FIG. 1.

In step 260, it is determined if the write cache of the storage device is off. If the write cache is turned on, step 270 may be executed for determining if the cache data can be stored in the storage device after flushing the write cache. If the turned-on write cache cannot be flushed successfully, the present method may execute step 300 for reporting device repair failure and the storage device may switch to State 4, as indicated by the arrow A4 in FIG. 1.

In step 280, the device power is reset if the write cache of the storage device is off or data stored in the turned-on write cache can be flushed into the storage device successfully.

Device un-plugged interrupts are generated for informing the system that the storage device has been removed. In step 290, such device un-plugged interrupts are ignored and the predetermined period is provided so that the storage device may be stabilized before looping back to step 230 and switching to state 2, as indicated by the arrow A5 in FIG. 1.

In one embodiment, the storage device may be a hard disc of a computer. In another embodiment, the storage device may be an expansion unit of a network-attached storage (NAS). The present method may be applied to any power-controlled storage device.

In the present method, the device power may be reset one or more times in response to failing recovery operations. The storage device may be dropped in the compatibility verification operation when the maximum retry number of the recovery operation has been exceeded or the turned-on cache cannot be flushed successfully. Therefore, the present invention may prevent a functional storage device from being dropped when the failure of the recovery operation is caused by a temporary device error which may occur due to unready hardware status (such as slow disk or chip response) or poor storage device quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating a storage device, comprising:
   supplying a device power for running the storage device;
   performing a recovery operation on the storage device when detecting a device error;
   resetting the device power when the recovery operation fails;
   generating a device un-plugged interrupt associated with resetting the device power, wherein the device un-plugged interrupt is ignored;
   providing a predetermined period after resetting the device power;
   re-performing the recovery operation on the storage device after generating the device un-plugged interrupt and after providing the predetermined period; and
   performing a compatibility verification operation, comprising:
      determining whether a maximum retry number of the recovery operation has been exceeded after detecting the device error;
      re-performing the recovery operation on the storage device after resetting the device power when the maximum retry number of the recovery operation has not been exceeded; and
      reporting a device repair failure when the maximum retry number of the recovery operation has been exceeded.

2. The method of claim 1, further comprising:
   resetting the device power when the recovery operation fails and a write cache of the storage device is turned off.

3. The method of claim 1, further comprising:
   determining if cache data can be stored in the storage device after flushing a turned-on write cache of the storage device; and
   resetting the device power when the recovery operation fails and the cache data can be stored in the storage device.

4. The method of claim 1, wherein the storage device is a hard disc.

5. The method of claim 1, wherein the storage device is an expansion unit of a network-attached storage (NAS).

* * * * *